(12) United States Patent
Lee et al.

(10) Patent No.: US 12,498,173 B1
(45) Date of Patent: Dec. 16, 2025

(54) RAPID DRYING AND DIFFERENTIAL PRESSURE MEASURING DEVICE FOR EXHAUST GAS REDUCER

(71) Applicants: Jae Keun Lee, Daegu (KR); Sang Bae Jeon, Daegu (KR)

(72) Inventors: Jae Keun Lee, Daegu (KR); Sang Bae Jeon, Daegu (KR)

(73) Assignees: Jae Keun Lee, Daegu (KR); HI-TECH DIESEL CORP., Daegu (KR)

( * ) Notice: Subject to any disclaimer, the term of this patent is extended or adjusted under 35 U.S.C. 154(b) by 0 days.

(21) Appl. No.: 19/320,789

(22) Filed: Sep. 5, 2025

(30) Foreign Application Priority Data

Jul. 30, 2025 (KR) .......... 10-2025-0103856

(51) Int. Cl.
| | |
|---|---|
| *F26B 21/12* | (2006.01) |
| *B01D 46/42* | (2006.01) |
| *B01D 46/79* | (2022.01) |
| *F01N 3/023* | (2006.01) |
| *F26B 21/00* | (2006.01) |
| *G01K 1/02* | (2021.01) |
| *G01K 13/024* | (2021.01) |
| *G01L 13/00* | (2006.01) |
| *G01L 19/00* | (2006.01) |

(52) U.S. Cl.
CPC .......... *F26B 21/12* (2013.01); *B01D 46/4263* (2013.01); *B01D 46/79* (2022.01); *F01N 3/023* (2013.01); *F26B 21/006* (2013.01); *G01K 1/026* (2013.01); *G01K 13/024* (2021.01); *G01L 13/00* (2013.01); *G01L 19/0092* (2013.01); *B01D 2279/30* (2013.01)

(58) Field of Classification Search
CPC ..... F26B 21/12; F26B 21/006; G01K 13/024; G01K 13/00; G01K 1/026; B01D 46/79; B01D 46/4263; B01D 2279/30; F01N 3/023; G01L 13/00; G01L 19/0092
See application file for complete search history.

(56) References Cited

U.S. PATENT DOCUMENTS

| | | | | |
|---|---|---|---|---|
| 4,635,381 A | * | 1/1987 | Hubbert | ................... F26B 21/12 34/571 |
| 4,771,552 A | * | 9/1988 | Morioka | ............... F26B 21/006 34/225 |
| 5,144,754 A | * | 9/1992 | Persson | ................... F26B 21/06 34/233 |

(Continued)

*Primary Examiner* — Edelmira Bosques
*Assistant Examiner* — Bao D Nguyen
(74) *Attorney, Agent, or Firm* — PARK LAW FIRM (57) ABSTRACT

The present invention relates to a differential pressure measuring device with a novel structure which is simple and accurately checks a state of an exhaust gas reduction filter (3). The rapid drying and differential pressure measuring device for an exhaust gas reducer according to the present invention may raise an exhaust gas reducer (1) for a commercial vehicle loaded on a lifting barrel (21) using a lifting cylinder (22) to bring the exhaust gas reducer (1) for a commercial vehicle into close contact with the upper adapter (23). Accordingly, there are advantages of effectively drying the exhaust gas reducer (1) for a commercial vehicle by effectively supplying high temperature air into the exhaust gas reducer (1) for a commercial vehicle and drying various types of exhaust gas reducers for commercial vehicles with different vertical heights.

5 Claims, 10 Drawing Sheets

(56) References Cited

U.S. PATENT DOCUMENTS

| | | | | |
|---|---|---|---|---|
| 5,269,076 A | * | 12/1993 | Breckenridge | F26B 21/06 34/191 |
| 2010/0199912 A1 | * | 8/2010 | Holzheimer | B01D 46/42 239/8 |
| 2011/0274827 A1 | * | 11/2011 | Fritz | B05B 14/437 118/610 |
| 2012/0015102 A1 | * | 1/2012 | Nowack | B65D 23/08 427/230 |
| 2013/0105473 A1 | * | 5/2013 | Beaudry | B65D 25/34 220/1.5 |
| 2014/0020258 A1 | * | 1/2014 | Hihn | F26B 21/00 34/241 |
| 2016/0017534 A1 | * | 1/2016 | Yu | D06F 58/20 34/604 |
| 2017/0314853 A1 | * | 11/2017 | Natsume | F26B 3/04 |
| 2017/0314857 A1 | * | 11/2017 | Natsume | F26B 21/10 |
| 2018/0190093 A1 | * | 7/2018 | Krula | G08B 21/182 |

* cited by examiner

RAPID DRYING AND DIFFERENTIAL PRESSURE MEASURING DEVICE FOR EXHAUST GAS REDUCER

1. FIELD OF THE INVENTION

The present invention relates to a rapid drying and differential pressure measuring device for an exhaust gas reducer with a novel structure capable of effectively drying an exhaust gas reduction filter and drying a differential pressure.

2. DISCUSSION OF RELATED ART

Recently, with strict regulations on pollutants such as nitrogen oxides and various particulate matter emitted from diesel engines, exhaust gas reducers for purifying exhaust gases are being installed in exhaust pipes of diesel vehicles.

An exhaust gas reduction filter (that is, a diesel particulate filter (DPF)) is mounted in a housing to form such an exhaust gas reducer.

In this case, the exhaust gas reducer is classified as an exhaust gas reducer for a commercial vehicle or an exhaust gas reducer for a passenger vehicle.

Figure 1:
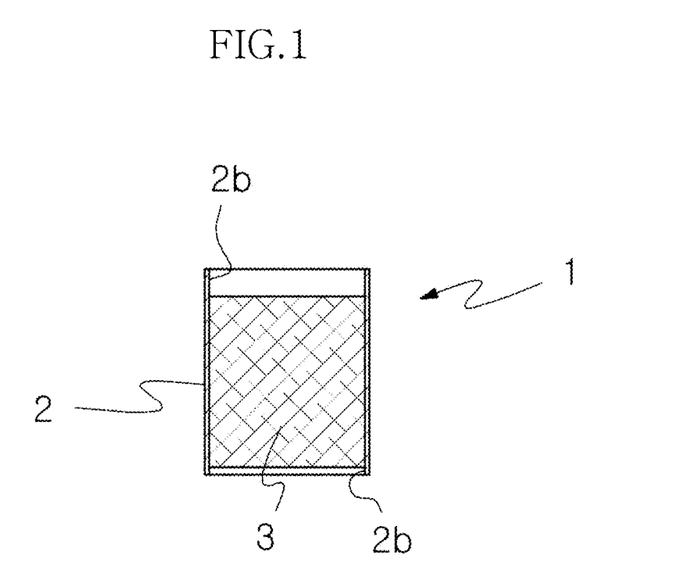
FIG. 1 is a side cross-sectional view illustrating the conventional exhaust gas reducer for a commercial vehicle.

As illustrated in FIG. 1, the exhaust gas reducer 1 for a commercial vehicle includes a housing 2 formed to vertically extend and including an entrance 2a at a lower side and an exit 2b formed at an upper side and an exhaust gas reduction filter 3 provided in the housing 2.

Figure 2:
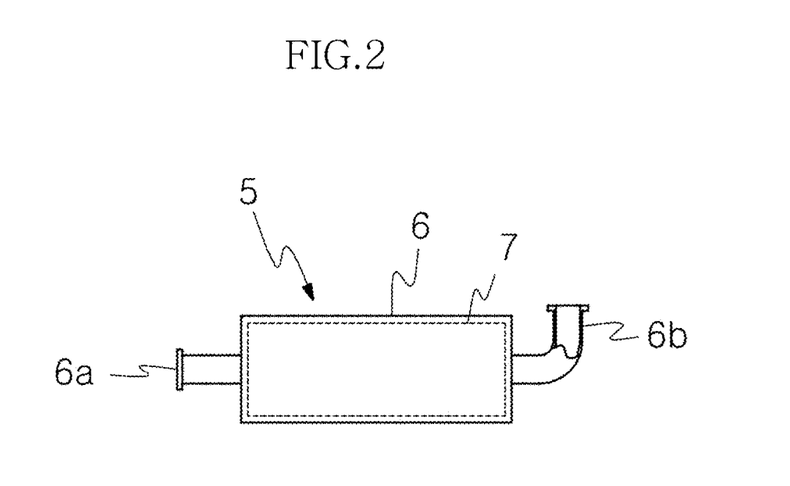
FIG. 2 is a side cross-sectional view illustrating the conventional exhaust gas reducer for a passenger vehicle.

In addition, as illustrated in FIG. 2, the exhaust gas reducer 5 for a passenger vehicle includes a housing 6 extending in a lateral direction and including an air supply pipe 6a and an exhaust pipe 6b provided at both ends and an exhaust gas reduction filter 7 provided in the housing 6.

Meanwhile, when such an exhaust gas reduction filter 3 or 7 is used for long time, pollutants contained in exhaust gas accumulate in the exhaust gas reduction filter 3 or 7 and degrade the performance thereof.

Accordingly, after such an exhaust gas reduction filter 3 or 7 is used for a predetermined time, a regeneration operation of regenerating the exhaust gas reduction filter 3 or 7 is performed by removing the pollutants from the exhaust gas reduction filter 3 or 7.

In this case, a method of washing the pollutants accumulated in the exhaust gas reduction filter 3 or 7 by supplying water to the exhaust gas reduction filter 3 or 7 of the exhaust gas reducer is widely used as a method of regenerating the exhaust gas reducer.

Accordingly, since the exhaust gas reduction filter 3 or 7 of the exhaust gas reducer of which the regeneration operation is completed is wetted by the water, the exhaust gas reduction filter 3 or 7 should be rapidly dried.

However, there is a problem that a method of rapidly drying the exhaust gas reduction filter 3 or 7 is not provided.

In addition, before or after the regeneration operation of such an exhaust gas reducer is performed, a state of the exhaust gas reduction filter 3 or 7 should be checked by measuring a differential pressure.

However, since the operation of measuring the differential pressure of the exhaust gas reducer and the operation of drying the exhaust gas reducer are performed through separate processes, a problem that the operations are complicated occurs. Accordingly, a new method capable of solving such problems is required.

RELATED ART

[Patent Document]
(Patent Document 1) Korean Laid-open Patent No. 10-1378560.

SUMMARY OF THE INVENTION

The present invention is directed to solving the problems and to providing a rapid drying and differential pressure measuring device for an exhaust gas reducer with a new structure capable of effectively drying an exhaust gas reduction filter and measuring a differential pressure.

The present invention for achieving the objectives provides a rapid drying and differential pressure measuring device for an exhaust gas reducer which includes a main body (10) which includes a lower support (11) and an upper support (12) located on the lower support (11) and in which a concave portion (11b) concave downward is formed in an upper surface of the lower support (11) and an exhaust pipe (11c) is provided at one side of the concave portion (11b), a lifting barrel (21) which is formed in a cylindrical shape, of which a lower surface is open and an upper surface is provided with a plurality of through holes (21a) formed therein, and airtightly coupled to the concave portion (11b) and of which the upper surface allows an exhaust gas reducer (1) for a commercial vehicle to be loaded thereon, a lifting cylinder (22) connected to the lifting barrel (21) to raise or lower the lifting barrel (21), an upper adapter (23) which is provided on a lower surface of the upper support (12) and airtightly coupled to the exhaust gas reducer (1) for a commercial vehicle when the lifting barrel (21) is raised, a ring blower (24) provided in the lower support (11) and connected to the upper adapter (23) through an air supply pipe (25) to supply air to the upper adapter (23), a heater (26) which is provided in a middle portion of the air supply pipe (25) to divide the air supply pipe (25) into a first air supply part (25a) connected to the ring blower (24) and a second air supply part (25b) connected to the upper adapter (23) and heats air supplied through the air supply pipe (25), an entrance temperature sensor (31) provided in the second air supply part (25b) to measure a temperature of air supplied to the upper adapter (23), an exit temperature sensor (32) provided in the concave portion (11b) to measure an internal temperature of the concave portion (11b), a humidity sensor (33) provided in the concave portion (11b), and a controller (34) which receives signals of the entrance temperature sensor (31), the exit temperature sensor (32), and the humidity sensor (33) to control operation of the ring blower (24) and the heater (26), wherein, when the exhaust gas reducer (1) for a commercial vehicle is disposed on the upper surface of the lifting barrel (21), and the lifting cylinder (22) raises the lifting barrel (21), an upper end of the exhaust gas reducer (1) for a commercial vehicle is airtightly coupled to the upper adapter (23), and when the ring blower (24) is turned on, the air is supplied to the upper adapter (23) and discharged to the concave portion (11b) through the exhaust gas reducer (1) for a commercial vehicle and a through hole (21a) of the lifting barrel (21).

According to another feature of the present invention, the upper adapter (23) may be formed in a funnel shape of which an inner diameter increases downward, an air supply hole (23a) may be formed at one side of the upper adapter (23), a lifting pipe body (23b) extending upward, coupled to the upper support (12) to be raised and lowered, and connected to the second air supply part (25b) may be provided in the air supply hole (23a), the rapid drying and differential pressure measuring device for an exhaust gas reducer may further include a pressure spring (23e) connected to the upper adapter (23) to press the upper adapter (23) downward and a raising detector (15) provided on the upper support (12) to detect raising of the upper adapter (23), an input unit (34a) which is manipulated by a worker to input a control command may be provided on the controller (34), when the worker arranges the exhaust gas reducer (1) for a commercial vehicle on the upper surface of the lifting barrel (21) and manipulates the input unit (34a) to input a dry command, the controller (34) may raise the lifting barrel (21) using the lifting cylinder (22), when the raising detector detects the raising of the upper adapter (23), the controller (34) may stop the lifting cylinder (22) and turn the ring blower (24) and the heater (26) on to supply high temperature air to the upper adapter (23) and the exhaust gas reducer (1) for a commercial vehicle, when an internal humidity of the concave portion (11b) measured by the humidity sensor (33) decreases to a preset reference humidity or less, the controller (34) may turn the heater (26) off, and when an internal temperature of the concave portion (11b) measured by the exit temperature sensor (32) decreases to a preset cooling temperature or less, the controller (34) may turn the ring blower (24) off.

According to still another feature of the present invention, the rapid drying and differential pressure measuring device for an exhaust gas reducer may further include a 3-way valve (27) provided in the first air supply part (25a) a branched pipe (28) connected to the 3-way valve (27), and an end portion differential air pressure sensor (29) connected to the branched pipe (28) to measure a differential pressure of the exhaust gas reducer (1) for a commercial vehicle.

According to yet another feature of the present invention, the rapid drying and differential pressure measuring device for an exhaust gas reducer may further include a coupling pipe body (36) coupled to an air supply hole (23a) of the upper adapter (23), a connection pipe (37) connected to the coupling pipe body (36), and a differential pressure measurement adapter (38) coupled to the connection pipe (37) to be connected to an air supply pipe (6a) or exhaust pipe (6b) of the exhaust gas reducer (5) for a passenger vehicle.

According to yet another feature of the present invention, a support (11a) extending upward may be provided on a rear surface of the lower support (11), the upper support (12) may be provided on an upper end of the support (11a), a discharge hole (11d) may be formed in a front surface of the support (11a), an exhaust pipe (11e) extending rearward may be provided in the discharge hole (11d), the rapid drying and differential pressure measuring device for an exhaust gas reducer may further include left and right rotation panels (41, 42) which extend in forward and rearward and of which rear end portions are coupled to both sides of the front surface of the support (11a) to be rotated in a lateral direction, rotation driving units (43) connected to the left and right rotation panels (41, 42) to rotate the left and right rotation panels (41, 42) in the lateral direction, and a discharge fan (44) provided in the exhaust pipe (11e), extension portions (41a, 42a) extending toward each other may be formed on front end portions of the left and right rotation panels (41, 42), when the left and right rotation panels (41, 42) rotate forward, the left and right rotation panels (41, 42) may be disposed to surround an outer portion of the exhaust gas reducer (1) for a commercial vehicle loaded on the lifting barrel (21), and when the discharge fan (44) is driven, air may be suctioned inside the left and right rotation panels (41, 42) to cool the exhaust gas reducer for a commercial vehicle loaded on the lifting barrel (21) and discharged to the outside through the exhaust pipe (11e).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present invention will be described in detail with reference to the accompanying exemplary drawings.

FIGS. 3 to 6 are views illustrating a rapid drying and differential pressure measuring device for an exhaust gas reducer which includes a main body 10, a lifting barrel 21 provided in the main body 10, a lifting cylinder 22 connected to the lifting barrel 21 to raise or lower the lifting barrel 21, an upper adapter 23 provided in the main body 10 and coupled to an exhaust gas reducer 1 for a commercial vehicle, a ring blower 24 connected to the upper adapter 23 through an air supply pipe 25 to supply air to the upper adapter 23, a heater 26 provided in the middle portion of the air supply pipe 25 to heat the air supplied through the air supply pipe 25, a 3-way valve 27 provided in the air supply pipe 25, a branched pipe 28 connected to the 3-way valve 27, an end portion differential air pressure sensor 29 connected to the branched pipe 28 to measure a differential pressure of the exhaust gas reducer 1 for a commercial vehicle, an entrance temperature sensor 31 provided in the air supply pipe 25 to measure a temperature of the air supplied to the upper adapter 23, an exit temperature sensor 32 and a humidity sensor 33 which are provided in the main body 10, a controller 34 which receives signals of the entrance temperature sensor 31, the exit temperature sensor 32, and the humidity sensor 33 and controls operation of the ring blower 24, the heater 26, and the 3-way valve 27, and an end portion differential air pressure sensor 29 connected to the air supply pipe 25 to measure a differential pressure of the exhaust gas reducer 1 for a commercial vehicle.

Figure 3:
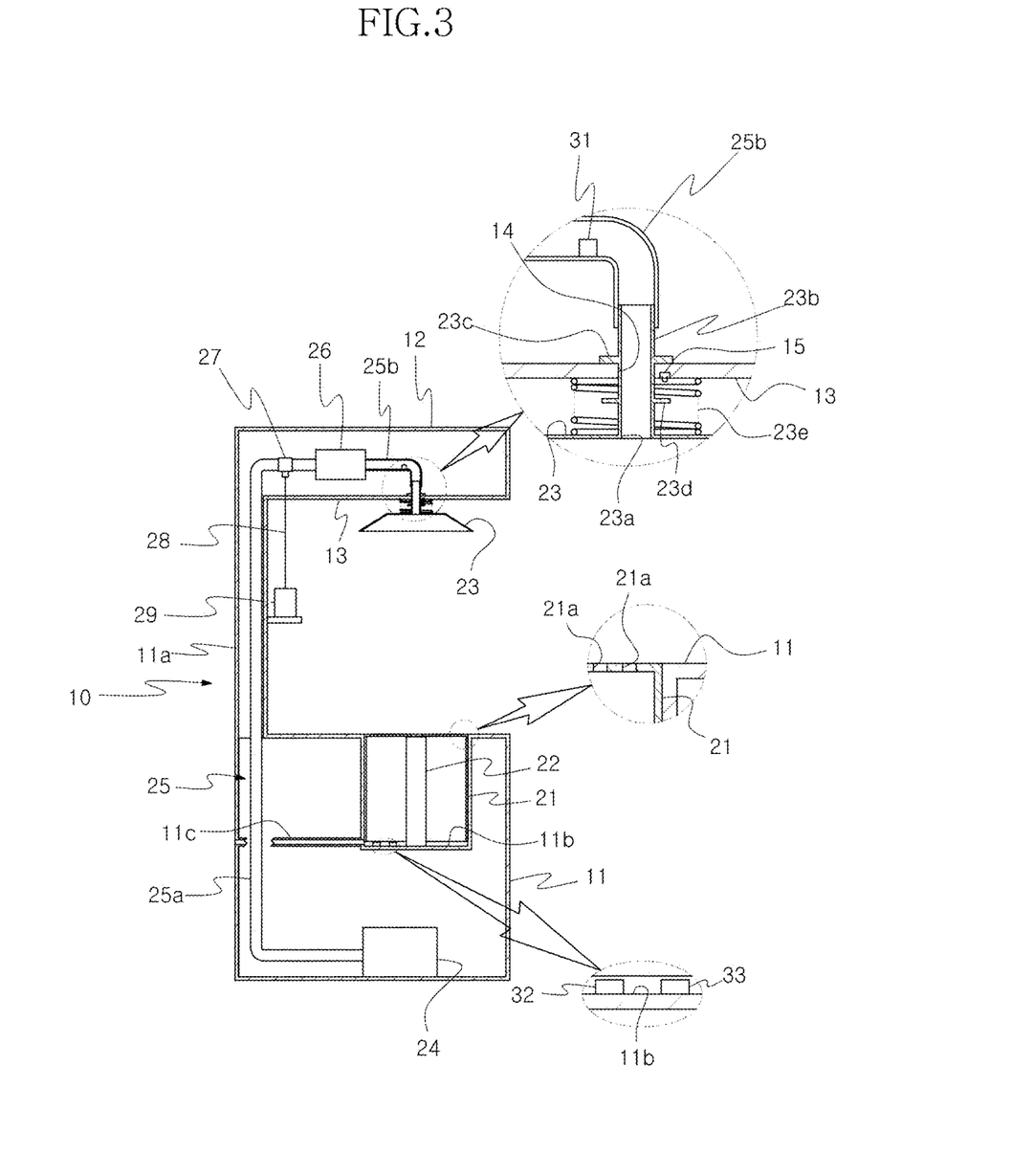
FIG. 3 is a side cross-sectional view illustrating a rapid drying and differential pressure measuring device for an exhaust gas reducer according to the present invention.

The main body 10 includes a lower support 11 and an upper support 12 located on the lower support 11.

The lower support 11 is formed in a quadrangular box shape in which a space portion is formed and includes a support 11*a* provided on a rear surface to extend upward, a concave portion 11*b* formed in an upper surface to be concave downward, and an exhaust pipe 11*c* provided at one side of the concave portion 11*b* to extend rearward.

The upper support 12 is formed in a box shape in which a space portion is formed and provided on the support 11*a*, and a through hole 14 is formed in the middle of an upper plate 13 provided on a lower surface of the upper support 12.

The lifting barrel 21 is formed in a cylindrical shape of which a lower surface is open and in which a plurality of through holes 21*a* are formed in an upper surface on which the exhaust gas reducer 1 for a commercial vehicle may be loaded, is airtightly coupled to the concave portion 11*b*, and is raised and lowered by the lifting cylinder 22.

To this end, a packing, which is not illustrated, is provided on an outer surface of the lifting barrel 21 such that the lifting barrel 21 is airtightly coupled to an inner circumferential surface of the concave portion 11*b*.

The lifting cylinder 22 is provided in the concave portion 11*b* to extend vertically, and a piston rod extending upward is connected to the lifting barrel 21 and is elongated and shortened to raise or lower the lifting barrel 21.

The upper adapter 23 is formed in a funnel shape of which an inner diameter increases downward, includes an air supply hole 23*a* formed in a central portion of an upper surface of the upper adapter 23, and is coupled to the upper support 12 to be raised and lowered.

To this end, a lifting pipe body 23*b* extending upward is provided in the air supply hole 23*a*, and the lifting pipe body 23*b* is coupled to the through hole 14 formed in the upper support 12 to be raised and lowered.

In addition, upper and lower flanges 23*c* and 23*d* located above and below the upper plate 13 of the upper support 12 to be spaced apart from each other are provided in the middle of the lifting pipe body 23*b*, and when the lifting pipe body 23*b* is raised and lowered, the upper and lower flanges 23*c* and 23*d* are hooked on upper and lower surfaces of the upper plate 13, and thus raising and lowering distances of the lifting pipe body 23*b* and the upper adapter 23 are restricted.

In addition, the upper adapter 23 includes a pressure spring 23*e* which presses the upper adapter 23 downward, and the upper support 12 includes a raising detector which detects raising of the upper adapter 23.

The pressure spring 23*e* is located between the upper adapter 23 and the upper plate 13, and a compression coil spring which presses the upper adapter 23 downward is used as the pressure spring 23*e*.

A limited switch which is provided on the lower surface of the upper plate 13 and detects that the lower flange 23*d* is in close contact with the lower surface of the upper plate 13 when the upper adapter 23 is raised is used as the raising detector 15.

The ring blower 24 is formed to suction external air to supply the suctioned air to the upper adapter 23 through the air supply pipe 25.

In this case, the air supply pipe 25 is divided into a first air supply part 25*a* connected to the ring blower 24 through the heater 26 and a second air supply part 25*b* connected to the upper adapter 23.

In this case, the second air supply part 25*b* is formed of a metal material with high strength, and a front end portion of the second air supply part 25*b* extends downward and is slidably coupled to an upper end of the lifting pipe body 23*b*.

Accordingly, when the lifting pipe body 23*b* is raised and lowered, a state in which the lifting pipe body 23*b* is airtightly connected to the second air supply part 25*b* is maintained.

The heater 26 heats the air supplied through the first air supply part 25*a* and supplies the heated air to the upper adapter 23 through the second air supply part 25*b*. Operation of the 3-way valve 27 is controlled by the controller 34 such that the air supplied through the first air supply part 25*a* is controlled to be supplied to the heater 26 or the branched pipe 28.

The end portion differential air pressure sensor 29 is connected to the branched pipe 28 and formed to measure a differential pressure of the exhaust gas reducer for a commercial vehicle using the air supplied through the branched pipe 28.

Since the end portion differential air pressure sensor 29 is generally used to measure the differential pressure of the exhaust gas reducer 1 for a commercial vehicle, a detailed description thereof will be omitted.

Figure 4:
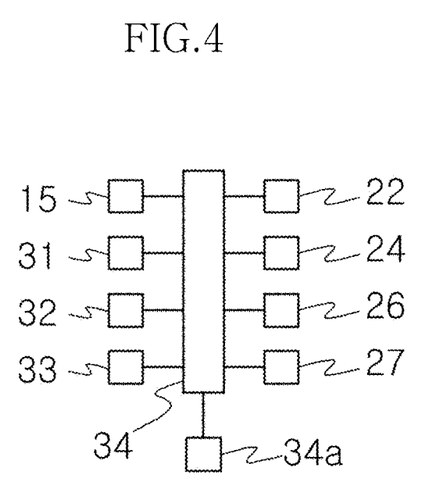
FIG. 4 is a block diagram illustrating the rapid drying and differential pressure measuring device for an exhaust gas reducer according to the present invention.

The controller 34 includes an input unit 34*a* formed such that a worker may manipulate the input unit 34*a* to input a control command therethrough.

In addition, a heating temperature, a cooling temperature, and a reference humidity are input to the controller 34.

A method of rapidly drying the exhaust gas reducer 1 for a commercial vehicle or measuring a differential pressure using the rapid drying and differential pressure measuring device for an exhaust gas reducer formed as described above will be described below.

Figure 5:
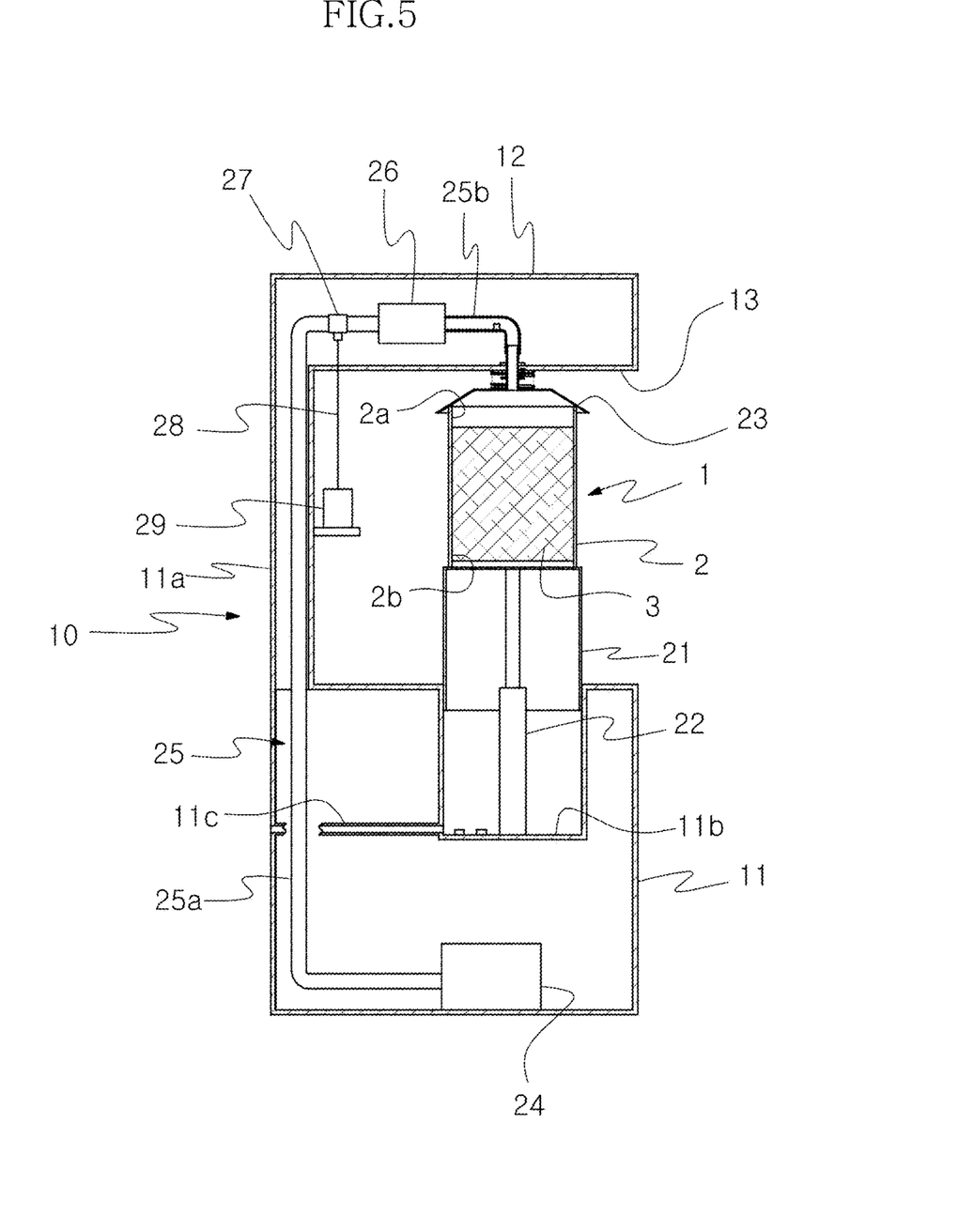
FIGS. 5 and 6 are reference view illustrating operation of the rapid drying and differential pressure measuring device for an exhaust gas reducer according to the present invention.

First, in a state in which the lifting barrel 21 is lowered, when the worker arranges the exhaust gas reducer 1 for a commercial vehicle on the upper surface of the lifting barrel 21 and manipulates the input unit 34*a* to input a dry command, the controller 34 controls the lifting cylinder 22 while feedbacking a signal of the raising detector 15 and raises the lifting barrel 21 and the exhaust gas reducer 1 for a commercial vehicle as illustrated in FIG. 5.

Figure 6:
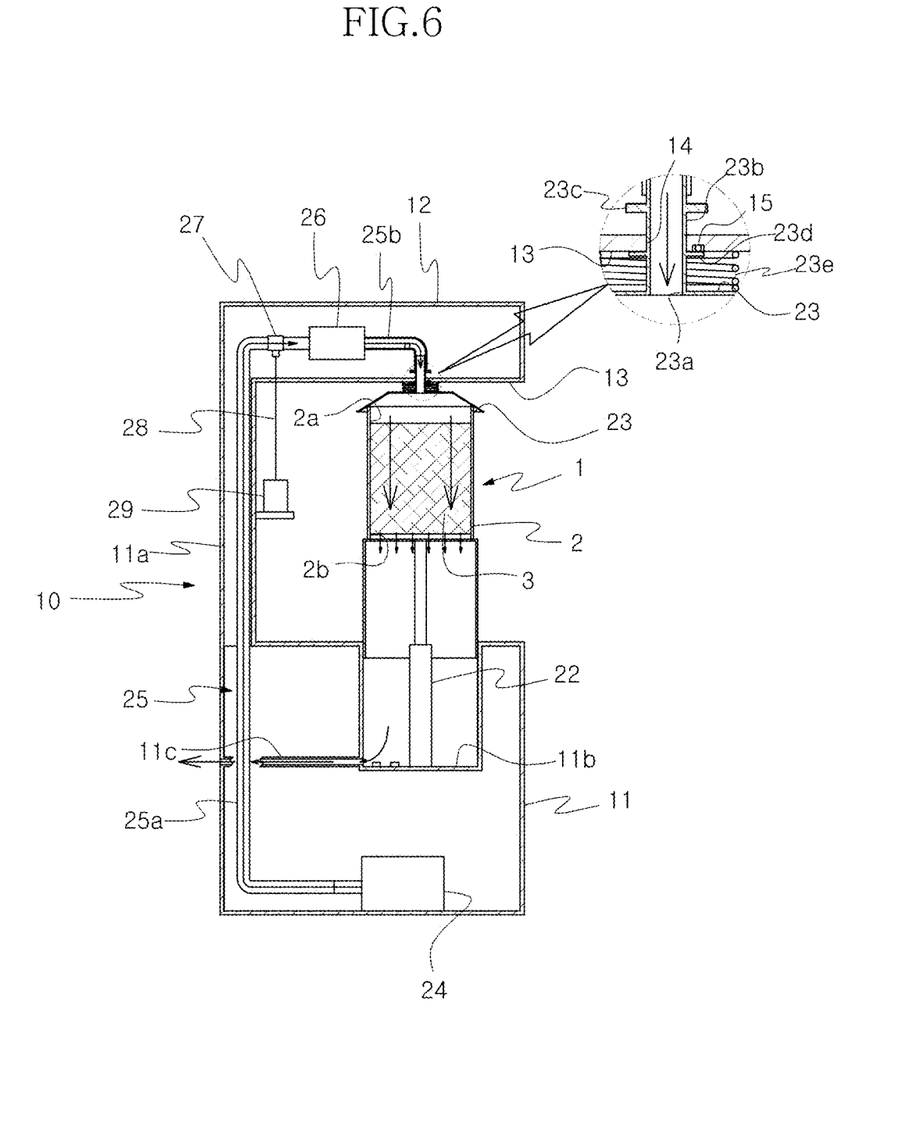

In addition, after an upper end of the exhaust gas reducer 1 for a commercial vehicle comes into close contact with the upper adapter 23, when the lifting barrel 21 and the exhaust gas reducer 1 for a commercial vehicle are further raised, the lower flange 23*d* of the lifting pipe body 23*b* presses the raising detector 15 while the upper adapter 23 is pushed upward as illustrated in FIG. 6.

In this case, as the upper adapter 23 is pressed downward by the pressure spring 23*e*, the upper adapter 23 is airtightly coupled to an upper surface of the exhaust gas reducer 1 for a commercial vehicle.

Accordingly, when the controller 34 detects raising of the upper adapter 23 by receiving a signal of the raising detector 15, the controller 34 determines that the exhaust gas reducer 1 for a commercial vehicle is airtightly coupled to the upper adapter 23 and stops the lifting cylinder 22.

In addition, the controller 34 turns the ring blower 24 on to supply air to the upper adapter 23 through the air supply pipe 25 and turns the heater 26 on to heat the air which is supplied to the upper adapter 23 to a preset heating temperature.

In this case, the controller 34 turns the heater 26 on and off while feedbacking a signal of the entrance temperature sensor 31 to maintain a temperature of the air which is supplied to the upper adapter 23 at a heating temperature±5°.

Meanwhile, the air supplied to the upper adapter 23 as described above is supplied to an entrance 2a of the exhaust gas reducer 1 for a commercial vehicle connected to the upper adapter 23, passes through an exhaust gas reduction filter 3, discharges through an exit 2b to heat and dry the exhaust gas reduction filter 3, is discharged to the concave portion 11b through a through hole 21a of the lifting barrel 21, and is discharged to the outside through the exhaust pipe 11c.

In addition, when the controller 34 receives a signal of the humidity sensor 33, and an internal humidity of the concave portion 11b decreases to a preset reference humidity or less, the controller 34 determines that the exhaust gas reducer 1 for a commercial vehicle is sufficiently dried and turns the heater 26 off.

Accordingly, the air supplied by the ring blower 24 is supplied to the exhaust gas reducer 1 for a commercial vehicle through the upper adapter 23 without being heated, cools the exhaust gas reducer 1 for a commercial vehicle while passing through the exhaust gas reducer, and is discharged to the concave portion 11b.

In addition, when the controller 34 measures an internal temperature of the concave portion 11b, that is, a temperature of air passing through the exhaust gas reducer 1 for a commercial vehicle, by receiving a signal of the exit temperature sensor 32, and the temperature of the air decreases to a pre-input cooling temperature or less, the controller 34 determines that the exhaust gas reducer 1 for a commercial vehicle is sufficiently cooled and turns the ring blower 24 off to complete operation.

In addition, when the worker manipulates the input unit 34a to input a differential pressure measurement command, the controller 34 controls the 3-way valve 27 to block a flow of air supplied to the heater 26 and supply the air supplied by the ring blower 24 to the end portion differential air pressure sensor 29 through the branched pipe 28.

Accordingly, the worker can measure the differential pressure of the exhaust gas reducer for a commercial vehicle using the end portion differential air pressure sensor 29

As the rapid drying and differential pressure measuring device for an exhaust gas reducer includes the main body 10, the lifting barrel 21 which is airtightly coupled to the concave portion 11b of the main body 10 and of which the upper surface allows the exhaust gas reducer 1 for a commercial vehicle to be loaded thereon, the lifting cylinder 22 connected to the lifting barrel 21 to raise or lower the lifting barrel 21, the upper adapter 23 provided on the lower surface of the upper support 12 and airtightly coupled to the exhaust gas reducer 1 for a commercial vehicle when the lifting barrel 21 is raised, the ring blower 24 provided in the lower support 11 and connected to the upper adapter 23 through the air supply pipe 25 to supply air to the upper adapter 23, the heater 26 which is provided in the middle portion of the air supply pipe 25 to divide the air supply pipe 25 into the first air supply part 25a connected to the ring blower 24 and the second air supply part 25b connected to the upper adapter 23, and heats the air supplied through the air supply pipe 25, the entrance temperature sensor 31 provided in the second air supply part 25b to measure a temperature of the air supplied to the upper adapter 23, the exit temperature sensor 32 provided in the concave portion 11b to measure an internal temperature of the concave portion 11b, the humidity sensor 33 provided in the concave portion 11b, and the controller 34 which receives signals of the entrance temperature sensor 31, the exit temperature sensor 32, and the humidity sensor 33 to control operation of the ring blower 24 and the heater 26, the lifting cylinder 22 can raise the exhaust gas reducer 1 for a commercial vehicle loaded on the lifting barrel 21 to bring the exhaust gas reducer 1 for a commercial vehicle into close contact with the upper adapter 23.

Accordingly, there are advantages of effectively drying the exhaust gas reducer 1 for a commercial vehicle by effectively supply high temperature air into the exhaust gas reducer 1 for a commercial vehicle and drying various types of exhaust gas reducers for commercial vehicles with different vertical heights.

In addition, as the upper adapter 23 is formed in the funnel shape in which the inner diameter increases downward, the air supply hole 23a is formed at one side of the upper adapter 23, the lifting pipe body 23b which extends upward, is coupled to the upper support 12 to be raised and lowered, and is connected to the second air supply part 25b is provided in the air supply hole 23a, and the pressure spring 23e connected to the upper adapter 23 to press the upper adapter 23 downward and the raising detector 15 provided in the upper support 12 to detect raising of the upper adapter 23 are further provided, when the exhaust gas reducer 1 for a commercial vehicle loaded on the lifting barrel 21 is coupled to the upper adapter 23, the coupling is confirmed, the lifting cylinder 22 is stopped, and thus there is an advantage of preventing the lifting barrel 21 from being excessively raised and the exhaust gas reducer 1 for a commercial vehicle loaded on the lifting barrel 21 or the upper adapter 23 from being damaged.

In addition, as the 3-way valve 27 provided in the first air supply part 25a, the branched pipe 28 connected to the 3-way valve 27, and the end portion differential air pressure sensor 29 connected to the branched pipe 28 to measure a differential pressure of the exhaust gas reducer 1 for a commercial vehicle are further provided, after the exhaust gas reducer 1 for a commercial vehicle is dried, the differential pressure can be measured using the end portion differential air pressure sensor 29, and thus there is an advantage of performing the dry operation and the differential pressure measurement operation at one location so that the operation is easier.

Figure 7:
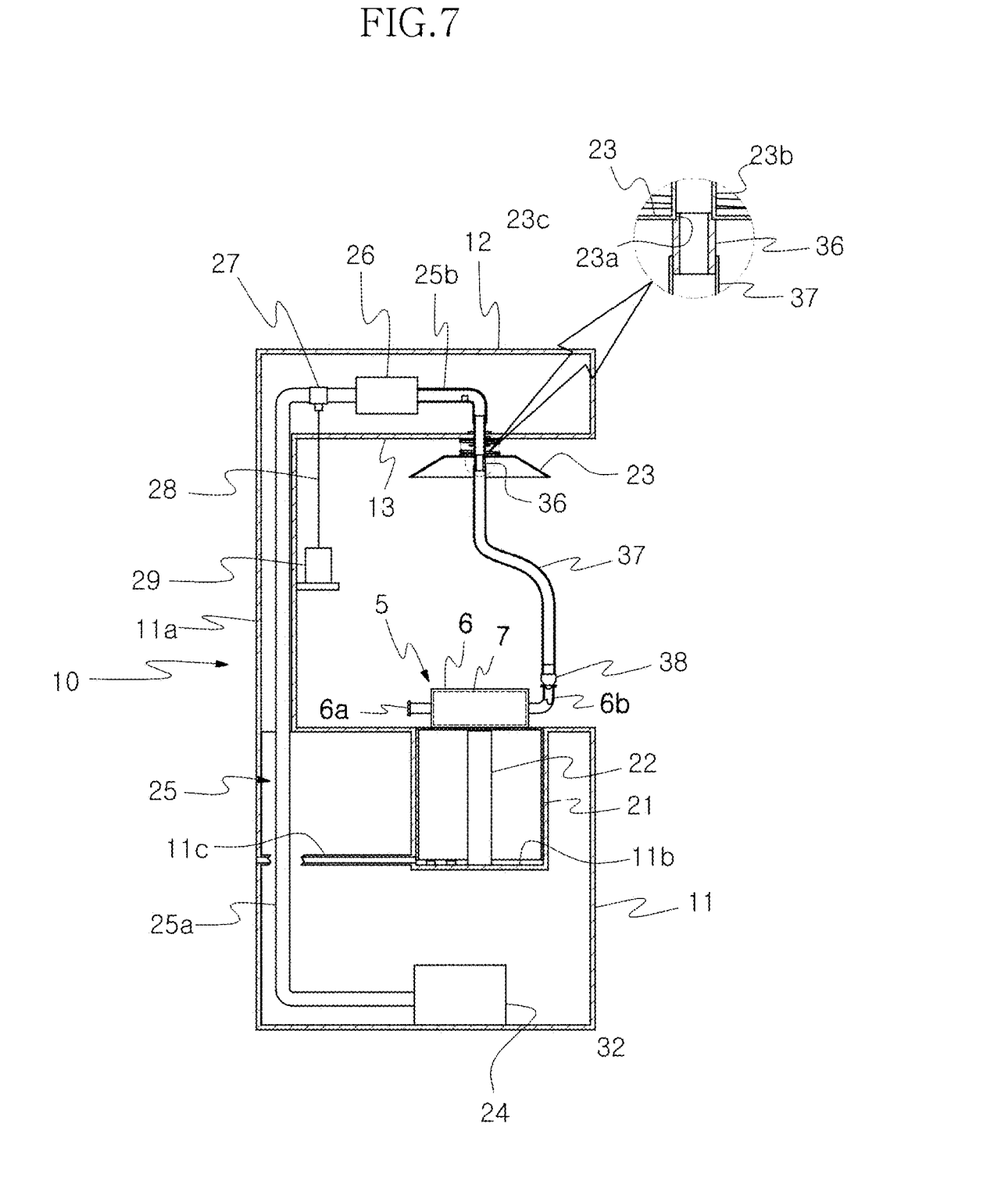
FIG. 7 is a reference view illustrating a second example of the rapid drying and differential pressure measuring device for an exhaust gas reducer according to the present invention.

FIG. 7 is a view illustrating a second example according to the present invention, in which a coupling pipe body 36 coupled to the air supply hole 23a of the upper adapter 23, a connection pipe 37 connected to the coupling pipe body 36, and a differential pressure measurement adapter 38 coupled to the connection pipe 37 to be connected to an air supply pipe 6a or an exhaust pipe 6b of an exhaust gas reducer 5 for a passenger vehicle are further provided.

The coupling pipe body 36 is coupled to the air supply hole 23a to extend downward from the air supply hole 23a.

The connection pipe 37 is formed of a flexible and heat resistant synthetic resin material.

The differential pressure measurement adapter 38 is formed to measure a differential pressure of the exhaust gas reducer 5 for a passenger vehicle when high pressure air is supplied to the differential pressure measurement adapter 38 through the connection pipe 37 in a state in which the differential pressure measurement adapter 38 is coupled to the air supply pipe 6a or the exhaust pipe 6b of the exhaust gas reducer 5 for a passenger vehicle.

Since various shapes of the differential pressure measurement adapter 38 have been developed and are widely used, a detailed description thereof will be omitted.

Accordingly, when the differential pressure measurement adapter 38 is coupled to the air supply pipe 6a or the exhaust pipe 6b of the exhaust gas reducer 5 for a passenger vehicle, and the ring blower 24 and the heater 26 are turned on, heated air is supplied to the exhaust gas reducer 5 for a passenger vehicle through the lifting pipe body 23b, the coupling pipe body 36, the connection pipe 37, and the differential pressure measurement adapter 38 to dry the exhaust gas reducer 5 for a passenger vehicle.

In addition, after the dry operation is completed, a differential pressure of the exhaust gas reducer 5 for a passenger vehicle may be measured using the differential pressure measurement adapter 38.

Since the rapid drying and differential pressure measuring device for an exhaust gas reducer formed as described above can dry the exhaust gas reducer 5 for a passenger vehicle or measure a differential pressure using the coupling pipe body 36, the connection pipe 37, and the differential pressure measurement adapter 38, there is an advantage of improving utilization.

FIGS. 8 to 11 are views illustrating a third example according to the present invention, in which a discharge hole 11d is formed in a front surface of the support 11a and an exhaust pipe 11e extending rearward is provided in the discharge hole 11d. In addition, left and right rotation panels 41 and 42 which extend in a front-rear direction and of which rear end portions are rotatably coupled to both sides of the front surface of the support 11a in a lateral direction, rotation driving units 43 which are connected to the left and right rotation panels 41 and 42 to rotate the left and right rotation panels 41 and 42 in the lateral direction, and a discharge fan 44 provided in the exhaust pipe 11e are further provided.

Figure 8:
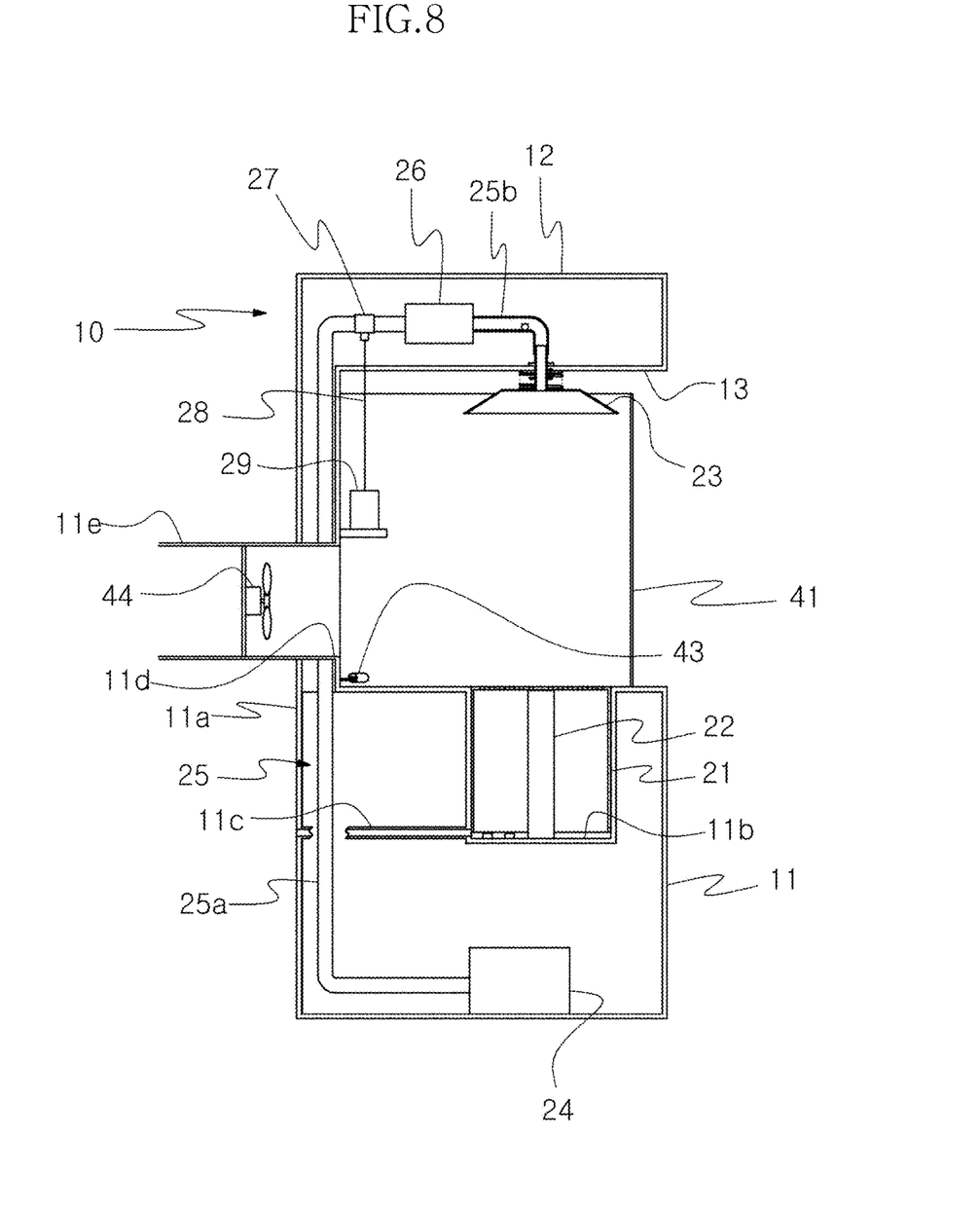
FIG. 8 is a side cross-sectional view illustrating a third example of the rapid drying and differential pressure measuring device for an exhaust gas reducer according to the present invention.
Figure 9:
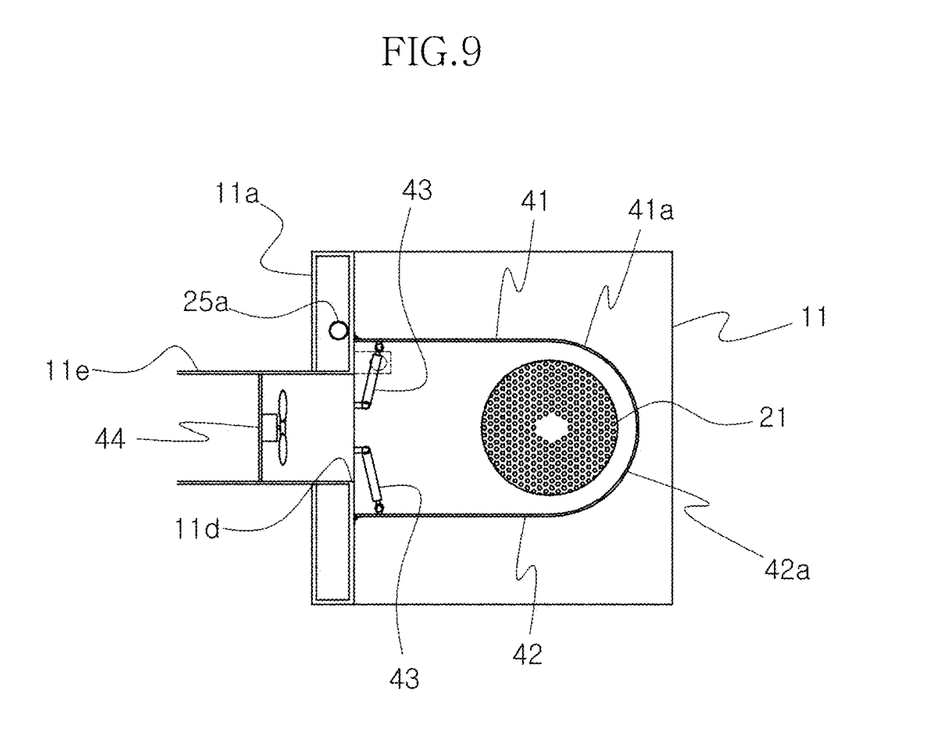
FIG. 9 is a plan cross-sectional view illustrating the third example of the rapid drying and differential pressure measuring device for an exhaust gas reducer according to the present invention.

The left and right rotation panels 41 and 42 are each formed of a heat resistant material in a plate shape of which a level is slightly lower than a level of the support 11a in a vertical direction and are coupled to both sides of the front surface of the support 11a to be rotated through hinges provided on the rear end portions.

In this case, lower ends of the left and right rotation panels 41 and 42 are disposed close to the upper surface of the lower support 11.

In addition, extension portions 41a and 42a extending toward each other are formed on front end portions of the left and right rotation panels 41 and 42.

The extension portions 41a and 42a are each formed in an arc shape about the lifting barrel, the left and right rotation panels 41 and 42 extend forward, the extension portions 41a and 42a are in close contact with each other, and the left and right rotation panels 41 and 42 are formed to surround the lifting barrel and the exhaust gas reducer 1 for a commercial vehicle loaded on the lifting barrel.

In this case, the discharge hole 11d is formed to be located between the left and right rotation panels 41 and 42.

Cylinder units which are connected to the left and right rotation panels 41 and 42 to rotate the left and right rotation panels 41 and 42 to extend in a forward direction or the lateral direction when the cylinder units are elongated or shortened are used as the rotation driving units 43.

The discharge fan 44 is formed to be operated by the controller to suction air in front of the discharge hole and discharge the air through the exhaust pipe 11e. Operation of the rapid drying and differential pressure measuring device for an exhaust gas reducer formed as described above will be described below.

Figure 10:
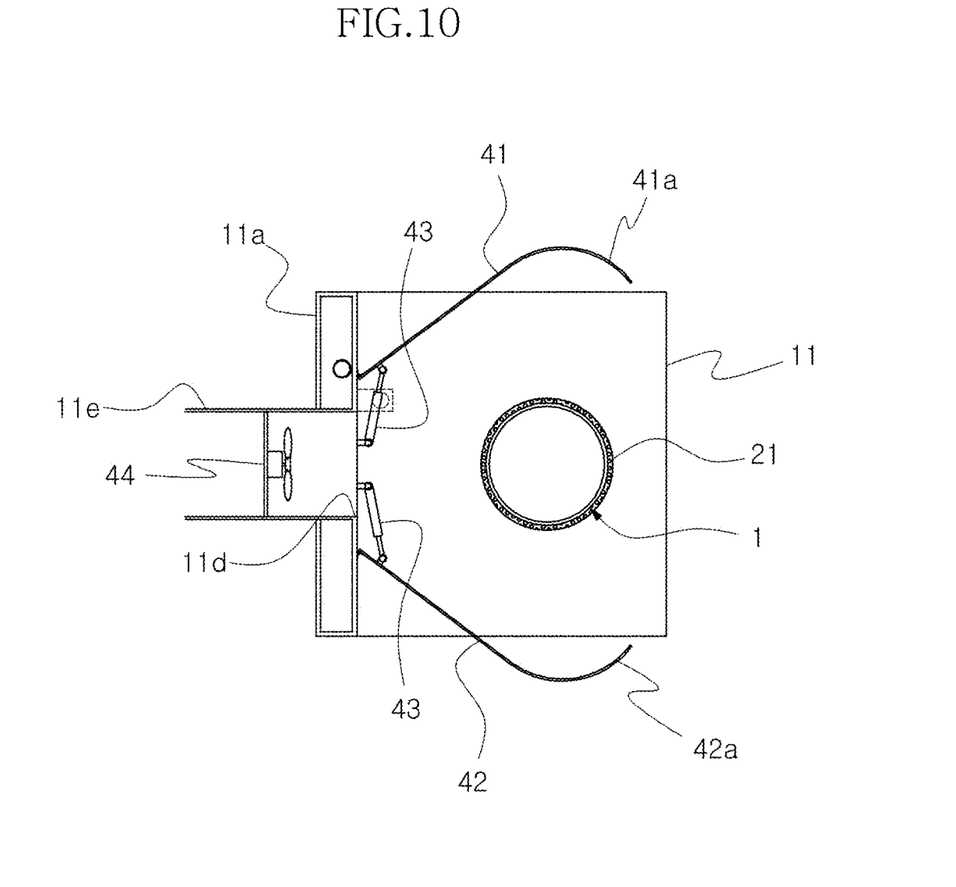
FIGS. 10 and 11 are reference views illustrating operation of the third example of the rapid drying and differential pressure measuring device for an exhaust gas reducer according to the present invention.

First, as illustrated in FIG. 10, in the beginning, the left and right rotation panels 41 and 42 rotate outward in the lateral direction to open a front side of the lifting barrel 21.

Figure 11:
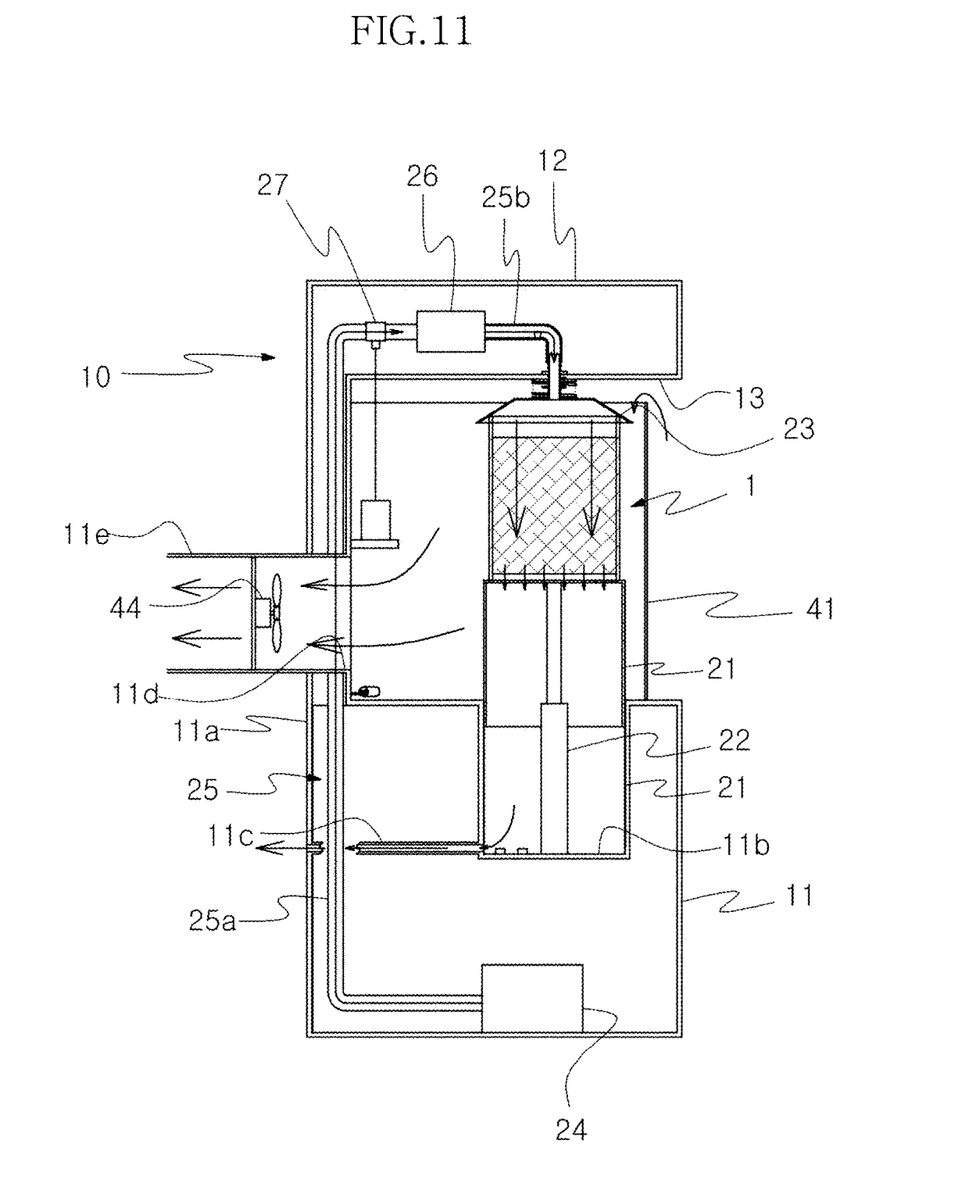

In addition, when the worker loads the exhaust gas reducer 1 for a commercial vehicle on the lifting barrel 21 and manipulates the input unit 34a to dry the exhaust gas reducer 1 for a commercial vehicle, as illustrated in FIG. 11, the controller 34 raises the lifting barrel 21 to couple the lifting barrel 21 to the upper adapter 23 and operates the ring blower 24 and the heater 26 to heat the exhaust gas reducer 1 for a commercial vehicle, and controls the rotation driving unit 43 to rotate the left and right rotation panels 41 and 42 forward at the same time such that the left and right rotation panels 41 and 42 surround an outer portion of the exhaust gas reducer 1 for a commercial vehicle.

In addition, the controller 34 drives the discharge fan 44.

When the discharge fan 44 is driven as described above, as illustrated in FIG. 11 with arrows, air above the left and right rotation panels 41 and 42 is suctioned into the left and right rotation panels 41 and 42, passes through the outer portion of the exhaust gas reducer 1 for a commercial vehicle to cool a surface of the exhaust gas reducer 1 for a commercial vehicle, and is discharged to the outside through the exhaust pipe 11e.

When the rapid drying and differential pressure measuring device for an exhaust gas reducer formed as described above dries the exhaust gas reducer 1 for a commercial vehicle, the left and right rotation panels 41 and 42 surround the outer portion of the exhaust gas reducer 1 for a commercial vehicle to prevent the worker from being burned by emission of heat of the heated exhaust gas reducer 1 for a commercial vehicle to the surroundings or the worker coming into contact with the heated exhaust gas reducer 1 for a commercial vehicle by mistake.

Particularly, as the surface of the exhaust gas reducer 1 for a commercial vehicle is cooled using the discharge fan 44, there is an advantage of preventing an operation environment from being degraded by a temperature of the surroundings being increased by heat of the exhaust gas reducer 1 for a commercial vehicle.

The lifting cylinder 22 according to the present invention can raise the exhaust gas reducer 1 for a commercial vehicle loaded on the lifting barrel 21 to bring the exhaust gas reducer 1 for a commercial vehicle into close contact with the upper adapter (23).

Accordingly, there are advantages of effectively drying the exhaust gas reducer 1 for a commercial vehicle by effectively supplying high temperature air into the exhaust gas reducer 1 for a commercial vehicle and drying various types of exhaust gas reducers for commercial vehicles with different vertical heights.

What is claimed is:

1. A rapid drying and differential pressure measuring device for an exhaust gas reducer, comprising:
   a main body (10) which includes a lower support (11) and an upper support (12) located on the lower support (11) and in which a concave portion (11b) concave downward is formed in an upper surface of the lower support (11) and an exhaust pipe (11c) is provided at one side of the concave portion (11b);
   a lifting barrel (21) which is formed in a cylindrical shape, of which a lower surface is open and an upper surface is provided with a plurality of through holes (21a) formed therein, and airtightly coupled to the concave portion (11b) and of which the upper surface allows the exhaust gas reducer (1) for a commercial vehicle to be loaded thereon;

a lifting cylinder (22) connected to the lifting barrel (21) to raise or lower the lifting barrel (21);

an upper adapter (23) which is provided on a lower surface of the upper support (12) and airtightly coupled to the exhaust gas reducer (1) for the commercial vehicle when the lifting barrel (21) is raised;

a ring blower (24) provided in the lower support (11) and connected to the upper adapter (23) through an air supply pipe (25) to supply air to the upper adapter (23);

a heater (26) which is provided in a middle portion of the air supply pipe (25) to divide the air supply pipe (25) into a first air supply part (25a) connected to the ring blower (24) and a second air supply part (25b) connected to the upper adapter (23) and heats air supplied through the air supply pipe (25);

an entrance temperature sensor (31) provided in the second air supply part (25b) to measure a temperature of air supplied to the upper adapter (23);

an exit temperature sensor (32) provided in the concave portion (11b) to measure an internal temperature of the concave portion (11b);

a humidity sensor (33) provided in the concave portion (11b); and a controller (34) which receives signals of the entrance temperature sensor (31), the exit temperature sensor (32), and the humidity sensor (33) to control operation of the ring blower (24) and the heater (26), wherein, when the exhaust gas reducer (1) for the commercial vehicle is disposed on the upper surface of the lifting barrel (21), and the lifting cylinder (22) raises the lifting barrel (21), an upper end of the exhaust gas reducer (1) for the commercial vehicle is airtightly coupled to the upper adapter (23), and when the ring blower (24) is turned on, the air is supplied to the upper adapter (23) and discharged to the concave portion (11b) through the exhaust gas reducer (1) for the commercial vehicle and the through hole (21a) of the lifting barrel (21).

2. The rapid drying and differential pressure measuring device for the exhaust gas reducer of claim 1, wherein:

the upper adapter (23) is formed in a funnel shape of which the inner diameter increases downward;

an air supply hole (23a) is formed at one side of the upper adapter (23);

a lifting pipe body (23b) extending upward, coupled to the upper support (12) to be raised and lowered, and connected to the second air supply part (25b) is provided in the air supply hole (23a);

the rapid drying and differential pressure measuring device for the exhaust gas reducer further includes a pressure spring (23e) connected to the upper adapter (23) to press the upper adapter (23) downward and a raising detector (15) provided on the upper support (12) to detect raising of the upper adapter (23);

an input unit (34a) which is manipulated by a worker to input a control command is provided on the controller (34);

when the worker arranges the exhaust gas reducer (1) for the commercial vehicle on the upper surface of the lifting barrel (21) and manipulates the input unit (34a) to input a dry command, the controller (34) raises the lifting barrel (21) using the lifting cylinder (22);

when the raising detector detects the raising of the upper adapter (23), the controller (34) stops the lifting cylinder (22) and turns the ring blower (24) and the heater (26) on to supply high temperature air to the upper adapter (23) and the exhaust gas reducer (1) for the commercial vehicle;

when an internal humidity of the concave portion (11b) measured by the humidity sensor (33) decreases to a preset reference humidity or less, the controller (34) turns the heater (26) off; and when an internal temperature of the concave portion (11b) measured by the exit temperature sensor (32) decreases to a preset cooling temperature or less, the controller (34) turns the ring blower (24) off.

3. The rapid drying and differential pressure measuring device for the exhaust gas reducer of claim 2, wherein:

a support (11a) extending upward is provided on a rear surface of the lower support (11);

the upper support (12) is provided on an upper end of the support (11a);

a discharge hole (11d) is formed in a front surface of the support (11a);

an exhaust pipe (11e) extending rearward is provided in the discharge hole (11d);

the rapid drying and differential pressure measuring device for the exhaust gas reducer further includes left and right rotation panels (41, 42) which extend forward and rearward and of which rear end portions are coupled to both sides of the front surface of the support (11a) to be rotated in a lateral direction, rotation driving units (43) connected to the left and right rotation panels (41, 42) to rotate the left and right rotation panels (41, 42) in the lateral direction, and a discharge fan (44) provided in the exhaust pipe (11e);

extension portions (41a, 42a) extending toward each other are formed on front end portions of the left and right rotation panels (41, 42);

when the left and right rotation panels (41, 42) rotate forward, the left and right rotation panels (41, 42) are disposed to surround an outer portion of the exhaust gas reducer (1) for the commercial vehicle loaded on the lifting barrel (21); and when the discharge fan (44) is driven, air is suctioned inside the left and right rotation panels (41, 42) to cool the exhaust gas reducer for the commercial vehicle loaded on the lifting barrel (21) and is discharged to the outside through the exhaust pipe (11e).

4. The rapid drying and differential pressure measuring device for the exhaust gas reducer of claim 1, further comprising:

a 3-way valve (27) provided in the first air supply part (25a);

a branched pipe (28) connected to the 3-way valve (27); and an end portion differential air pressure sensor (29) connected to the branched pipe (28) to measure a differential pressure of the exhaust gas reducer (1) for the commercial vehicle.

5. The rapid drying and differential pressure measuring device for the exhaust gas reducer of claim 1, further comprising:

a coupling pipe body (36) coupled to an air supply hole (23a) of the upper adapter (23);

a connection pipe (37) connected to the coupling pipe body (36); and a differential pressure measurement adapter (38) coupled to the connection pipe (37) to be connected to an air supply pipe (6*a*) or exhaust pipe (6*b*) of the exhaust gas reducer (5) for a passenger vehicle.

\* \* \* \* \*